(12) United States Patent
Stevick (10) Patent No.: US 10,968,547 B2
(45) Date of Patent: Apr. 6, 2021

(54) BULK METALLIC GLASS SHEETS AND PARTS MADE THEREFROM

(71) Applicant: Crucible Intellectual Property, LLC, Rancho Santa Margarita, CA (US)

(72) Inventor: Joseph W. Stevick, Olympia, WA (US)

(73) Assignee: Crucible Intellectual Property, LLC, Rancho Santa Margarita, CA (US)

( * ) Notice: Subject to any disclaimer, the term of this patent is extended or adjusted under 35 U.S.C. 154(b) by 204 days.

(21) Appl. No.: 15/280,840

(22) Filed: Sep. 29, 2016

(65) Prior Publication Data

US 2017/0090515 A1 Mar. 30, 2017

Related U.S. Application Data

(60) Provisional application No. 62/235,141, filed on Sep. 30, 2015.

(51) Int. Cl.
| | |
|---|---|
| *D03D 15/00* | (2021.01) |
| *G06F 1/16* | (2006.01) |
| *D03D 1/00* | (2006.01) |
| *H05K 5/04* | (2006.01) |
| *H04M 1/00* | (2006.01) |
| *H04M 1/18* | (2006.01) |

(52) U.S. Cl.
CPC ........... *D03D 1/0088* (2013.01); *D03D 15/00* (2013.01); *G06F 1/1633* (2013.01); *G06F 1/1637* (2013.01); *D10B 2101/12* (2013.01); *D10B 2101/20* (2013.01); *H04M 1/185* (2013.01)

(58) Field of Classification Search
CPC .. D03D 15/0011; D03D 1/0088; D03D 15/02; D03D 15/0066; D03D 2700/80; D10B 2101/20; H04M 1/185; G06F 1/16; A47B 2220/0091
USPC ..... 442/21, 6–8, 23, 31, 228, 229; 428/36.1; 148/403
See application file for complete search history.

(56) References Cited

U.S. PATENT DOCUMENTS

| | | | |
|---|---|---|---|
| 4,030,892 A * | 6/1977 | Mendelsohn | ......... C22C 45/008 148/306 |
| 4,163,821 A * | 8/1979 | Nienart | .................... C08J 5/043 174/389 |
| 5,288,344 A | 2/1994 | Peker et al. | |
| 5,368,659 A | 11/1994 | Peker et al. | |
| 5,567,251 A | 10/1996 | Peker et al. | |
| 5,618,359 A | 4/1997 | Lin et al. | |
| 5,735,975 A | 4/1998 | Lin et al. | |
| 6,325,868 B1 | 12/2001 | Kim et al. | |
| 6,771,490 B2 | 8/2004 | Peker et al. | |
| 8,888,940 B2 | 11/2014 | DiFonzo et al. | |
| 2006/0116040 A1* | 6/2006 | Yun | ..................... B29C 47/0016 442/2 |

(Continued)

*Primary Examiner* — Lee E Sanderson
*Assistant Examiner* — Michael C Romanowski
(74) *Attorney, Agent, or Firm* — Brownstein Hyatt Farber Schreck, LLP (57) ABSTRACT

Bulk metallic glass sheets and parts fabricated from individual bulk metallic glass fibers and tows are provided. Bulk metallic glass fibers and tows are used to prepare complex weave designs having desired thickness and fiber orientation for a particular use of a BMG feedstock. Appropriately designed bulk metallic glass weaves can be thermoplastically heated to form sheets and feedstock for parts having desired wall thickness and area coverage.

18 Claims, 7 Drawing Sheets

(56) References Cited

U.S. PATENT DOCUMENTS

| | | |
|---|---|---|
| 2006/0147690 A1 | 7/2006 | Vichniakov |
| 2007/0079907 A1 | 4/2007 | Johnson et al. |
| 2008/0118387 A1 | 5/2008 | Demetriou et al. |
| 2010/0289390 A1 | 11/2010 | Kenney |
| 2013/0306197 A1 | 11/2013 | Prest et al. |
| 2013/0306199 A1 | 11/2013 | Prest et al. |
| 2014/0004296 A1* | 1/2014 | Khokar ............. B29C 70/22 428/104 |
| 2014/0030948 A1 | 1/2014 | Kim |
| 2014/0082807 A1* | 3/2014 | Tuffile ............. F41H 1/02 2/2.5 |
| 2016/0361897 A1 | 12/2016 | Hofmann et al. |
| 2017/0087804 A1 | 3/2017 | O'Keeffe et al. |
| 2018/0284845 A1 | 10/2018 | Honma |

\* cited by examiner

BULK METALLIC GLASS SHEETS AND PARTS MADE THEREFROM

CROSS-REFERENCE TO RELATED APPLICATION(S)

This application is a non-provisional patent application of U.S. Provisional Patent Application No. 62/235,141, filed Sep. 30, 2015 and titled "BULK METALLIC GLASS SHEETS AND PARTS MADE THEREFROM," the disclosure of which is herein by reference in its entirety.

FIELD

The disclosure relates generally to woven bulk metallic glass sheets and more particularly to woven metallic glass sheets used as feedstock in the formation of BMG-based parts.

BACKGROUND

Bulk-solidifying amorphous alloys, or bulk metallic glasses ("BMG"), are a fairly recently developed class of metallic materials. BMGs have distinctive properties of hardness and elasticity, for example, which make them preferable over other conventional metallic alloys. These alloys may be solidified and cooled at relatively slow rates, and they retain the amorphous, non-crystalline state, at room temperature. If the cooling rate is not sufficiently high, crystals may form inside the alloy, so that the benefits of the amorphous state are partially or completely lost.

In this light, BMGs are generally heated and then quenched from above a BMG's alloy melting temperature to an ambient temperature. To quench, the BMG must be cooled at a critical cooling rate to maintain an amorphous state, this rate being up to 1000° C./sec (although more typically in the 50-100° C./sec range). In order to obtain a cooling rate equal to or above the critical cooling rate, heat must be extracted from the BMG itself. As such, the thickness of a BMG material becomes a limiting dimension, referred to as a BMG's "critical thickness."

Until recently, the processability of an amorphous alloy was limited, having critical thicknesses of less than 0.1 mm. With the advent of BMG alloys having lower critical cooling rates and with the introduction of better quenching techniques, the critical thickness of BMG materials has increased, but not far beyond 0.1 mm. It is still problematic to produce BMG materials having a critical thickness beyond 0.1 mm, particularly due to the before mentioned crystal formation, i.e., BMG that is both thicker than 0.1 mm and substantially free of crystals. Alternative methods of preparing BMG sheets are therefore required to fabricate BMG parts of useful dimensions.

The present disclosure is provided to overcome one or more of the issues discussed above.

SUMMARY

Embodiments herein provide BMG sheets for use as feedstock for parts formed therefrom.

BMG is extruded or otherwise manipulated to form BMG fibers which are bundled together into BMG tows. BMG tows with appropriate diameter and length for a desired feedstock are weaved together to form BMG weaves. Typical BMG weaves are flat, having a thickness generally provided by the tow diameter and the type of weave employed. BMG weave strength can be manipulated by using different diameter/strength tows and by designing the weave to incorporate the different diameter/strength tows in desired directions or densities. As such, BMG tow diameter and orientation can be used to fabricate desired BMG sheets and ultimately BMG parts based on, for example, thickness and strength.

BMG weaves can be fabricated by thermoplastically heating, under pressure, the BMG weave to above the BMG's glass transition temperature ("Tg"). The thermoplastic heating is particularly effective with embodiments herein because BMG weaves are formed from individual fibers and tows, where each BMG fiber or tow has a diameter below the plasticity boundary of most alloys. Heating under pressure allows the heated tows to retain greater plasticity than if the same amount of BMG was heated as a single molded part. This provides a significant benefit for the use of thermoplastic heating for BMG weaves over, for example, a BMG ingot of the same dimensions.

Thermoplastically heated weaves are quenched and provide BMG sheets and feedstock of appropriate thickness, for example, of critical thicknesses above 0.1 mm, and more typically above 0.5 mm. In some embodiments, multiple BMG weaves can be thermoplastically heated together, one on top of another, to form BMG sheets where one, two, three, four, and the like, BMG weaves can be layered and thermoplastically combined.

BMG weaves can alternatively be fabricated by impregnating the BMG weave with an adhesive epoxy and then curing the epoxy to hold the weave material together. In these embodiments the epoxy cured BMG weave can be layered with other epoxy impregnated BMG weaves to form complex parts, or be added to molds to form laminate BMG parts.

Embodiments herein also include integration of other composite material with BMG to modify the BMG weave strength, elasticity, ductility, pliability and the like. In some embodiments, composite fibers made of materials like carbon, aluminum, and titanium are combined with BMG fibers to form BMG composite tows, e.g., 50% BMG fibers, 25% carbon fibers, 25% aluminum fibers. BMG composite tows can be combined with BMG tows in forming BMG composite weaves.

In other embodiments, BMG composite weaves can be formed by integrating tows that are completely of a different material, for example, a weave fabricated from 90% BMG tows and 10% carbon tows. In either case where composite material is used to modify the BMG weave strength or ductility (via fibers into tows, or tows into weaves), the composite material is intermingled with the BMG to accomplish a desired increase in utility for the weave.

Finally, methods are provided for both forming the BMG weaves and BMG composite weave structures, as well as for fabricating near-net parts from both. Fabrication can be accomplished by using thermoplastic forming of a BMG weave into a molded shape or by layering epoxy impregnated BMG weaves into molded structures.

Other features and advantages of the present disclosure will be apparent from the accompanying drawings and from the detailed description that follows below.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

All publications, patents, and patent applications cited in this document are hereby incorporated by reference in their entirety.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to BMG weaves to create BMG sheets having desired thicknesses, areas, and pliabilities. The disclosure also relates to near-net shaped parts or articles fabricated from the BMG weave sheets through either thermoplastic heating or laminate adhesion techniques. The present embodiments provide a significant improvement over conventional BMG feedstock and part formation, both in the ease of formation and the utility of the resultant parts.

These and other embodiments are discussed below with reference to FIGS. 1-7. However, those skilled in the art will readily appreciate that the detailed description given herein with respect to these Figures is for explanatory purposes only and should not be construed as limiting.

Embodiments herein include BMG fibers bundled into tows, each tow designed for a target strength requirement, as well as to weaves formed from tows to form BMG sheets, cylinders, etc. and to the methods for forming the BMG tows and weaves. Such embodiments may provide BMG sheets for use as feedstock material in BMG part fabrication.

Embodiments herein also include BMG composite tows formed from a combination of BMG fibers and other composite materials (e.g., dry carbon fiber, aluminum, titanium, etc.). BMG composite tows exhibit the strength, elasticity, ductility, pliability, etc. of the combined fibers used to form the tow. BMG composite tows can be used to form BMG weaves of a composite nature.

In some embodiments, BMG tows may be combined with tows of 100% composite material ("composite tows"), to provide weaves of composite properties. In some embodiments, for example, a weave of BMG tows and dry carbon tows provide a BMG-carbon fiber composite. Such embodiments may provide BMG-composite weaves, sheets and feedstock for use in BMG part fabrication.

Embodiments herein include fabrication of BMG weaves into BMG sheets by thermoplastically heating, under pressure, the weave to a temperature above the Tg of the BMG. It is noted that fabricating BMG sheets from individual fibers and tows with diameters below the plasticity boundary of the alloy(s), allows the parts to retain greater plasticity than if they had been molded as a single monolithic piece. As such, the thermoplastic fabrication is more effective at producing thicker and more pliable BMG sheets with lower crystallinity than previously described methods.

Embodiments also include fabrication methods for parts prepared in the absence of thermoplastic forming temperatures. These parts are fabricated using temperatures more appropriate for epoxy curing. Here, BMG weave are impregnated with epoxy and layer by layer used to build a part in a mold. Such molded and laminated parts are cured using vacuum bagging, autoclaving, out-of-autoclave curing, heat pressing, or resin transfer molding (using the lower temperatures needed for epoxy curing).

In alternative embodiments, combinations of thermoplastic forming and epoxy curing methodologies can be used to form BMG parts. Here, thermoplastic forming of the BMG weave is first performed to form BMG sheets or near-net shaped part, and then epoxy impregnated BMG weaves are added to the thermoplastically formed sheets or parts at lower temperature by epoxy curing. The combined fabrication allows for complex part formation where aspects of the part are thermoplastically formed, and then epoxy impregnated BMG materials are layered on, for example, to form overhangs, undercuts, and the like.

BMG Parts fabricated in accordance with embodiments herein may have thin to thick walls, large areas, and can be made of composite materials. In some aspects, the fabricated part has thin walls, for example, a housing for an electronic. In other aspects, the parts herein can be useful for thick walls or larger areas, for example, in the fabrication of auto body parts, aerospace panels (airfoils, blades, etc.), satellite shields, and appliance body parts.

Finally, BMG parts fabricated in accordance with embodiments herein may be useful based on the BMG weave composition and weave orientation, for example, a BMG part's directional and tensile strength, a part's ability to absorb energy, and a part's stiffness may be dictated by the type of weave used in fabricating the part as well as by the types and amounts of materials used to make the BMG weave (BMG alloys and composite materials).

Bulk Metallic Glass (BMG)

BMG is a class of metallic materials that may be solidified and cooled at relatively slow rates, and retain their amorphous, non-crystalline state at room temperature. If the cooling rate of an amorphous alloy is not sufficient, termed the critical cooling rate, crystals may form inside the alloy, so that the benefits of the amorphous state can be lost. As such, one challenge to fabrication of BMG parts is partial crystallization in the BMG during the cooling process.

Crystal formation in an amorphous alloy provides a level of uncertainty to the quality of parts formed therefrom, uncertainty that can translate to increased costs and failure rates for parts fabricated from BMG alone. In order to obtain a cooling rate equal to or above the critical cooling rate, heat is extracted from the BMG itself. As such, the thickness of a BMG material is often a limiting factor on whether the critical cooling rate may be ascertained. The thickness of BMG, for a particular fabricating technique, that aligns with the critical cooling rate is termed the critical thickness.

Figure 1:
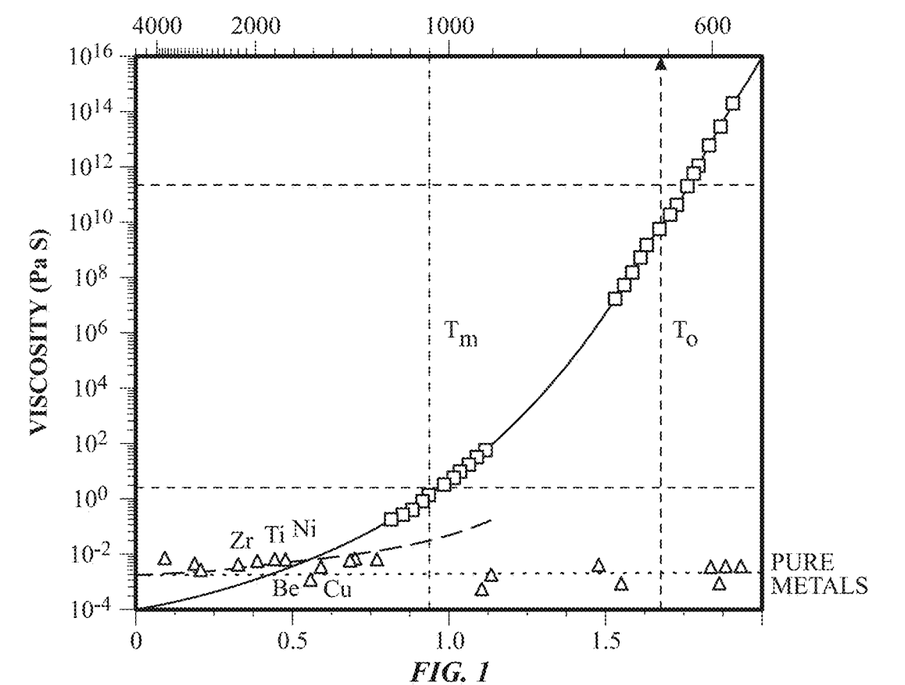
FIG. 1 is a temperature-viscosity diagram of an exemplary bulk metallic glass.

FIG. 1 shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a BMG during the formation of an amorphous solid. The molten alloy becomes more and more viscous with increased undercooling until it approaches solid from around the glass transition temperature (Tg). Accordingly, the temperature of solidification front for BMGs can be around the Tg, where the alloy will practically act as a solid for purposes of pulling out the quenched amorphous sheet product.

Figure 2:
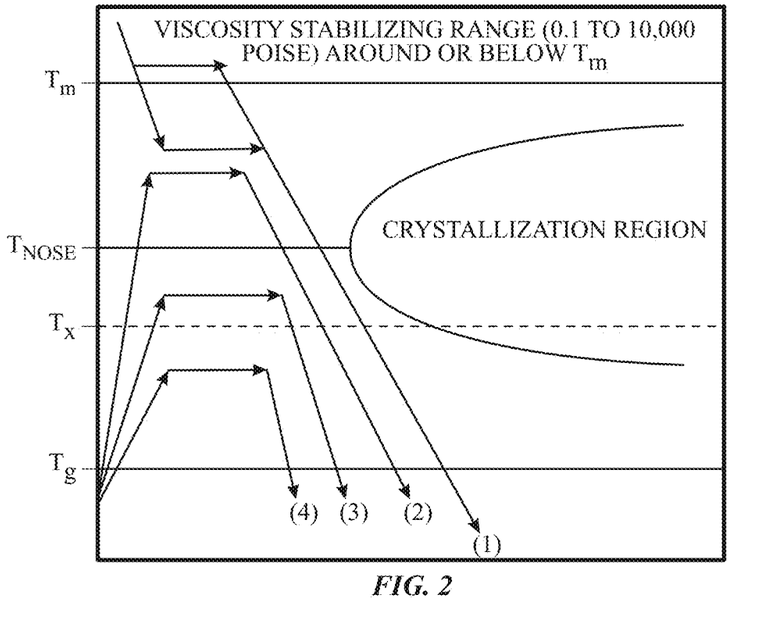
FIG. 2 is a time-temperature-transformation (TTT) diagram for an exemplary bulk metallic glass.

FIG. 2 shows a time-temperature-transformation (TTT) cooling curve of an exemplary BMG. BMGs do not experience a liquid/solid crystallization transformation upon cooling, as with conventional metals. Rather, the highly fluid, non-crystalline form of the metal found at high temperatures (near a melting temperature Tm) becomes more viscous as the temperature is reduced (near a Tg), eventually taking on the outward physical properties of conventional solids.

Although there is no liquid/crystallization transformation for a BMG, a "melting temperature" Tm may be defined as the thermodynamic liquidus temperature of the corresponding crystalline phase. The viscosity of the BMG at the melting temperature could lie in the range of about 0.1 poise (or lower) to about 10,000 poise. A lower viscosity at the melting temperature would provide faster and complete filling of intricate portions of a BMG weave, for example. The cooling rate of the molten metal to form a BMG weave, for example, is typically such that the time-temperature profile during cooling does not traverse through the nose-shaped region (Tnose) bounding the crystallized region in the TTT diagram of FIG. 2. In FIG. 2, the crystallization temperature Tx is where crystallization is most rapid and occurs in the shortest time scale.

The supercooled liquid region, which is the temperature region between Tg and Tx, is a manifestation of the extraordinary stability against crystallization of BMGs. In this temperature region the BMG can exist as a high viscosity liquid. The viscosity of the BMG in the supercooled liquid region can vary between $10^{12}$ Pas at the glass transition temperature down to $10^5$ Pas at the crystallization temperature, the high temperature limit of the supercooled liquid region. Liquids with such viscosities can undergo substantial plastic strain under an applied pressure. BMG tows used in weave embodiments herein make use of the large plastic formability in the supercooled liquid region.

Note that as used herein the term "alloy" refers to a homogenous mixture or a solid solution of two or more metals, the atoms of one replacing or occupying interstitial positions between the atoms of the other, for example, brass is an alloy of zinc and copper. The term "alloy" can also refer to an alloy-containing composite, i.e., a mixture or solid solution having two or more metals and including composite materials.

Also note that, as used herein the term "amorphous" or "non-crystalline," refer to a solid that lacks lattice periodicity, which is characteristic of a crystal. As used herein, an amorphous solid includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

An "amorphous alloy" is an alloy having an amorphous content of more than 50% by volume, typically more than 90% by volume and most typically more than 95% by volume. In some aspects an amorphous alloy can have an amorphous content of about 99% or more and up to about 100% by volume. Note that, amorphous by volume means to exhibit a disorderly atomic scale or arrangement as compared to most metals, which are highly ordered in atomic structure. Materials in which such a disordered structure is produced directly from the liquid state during cooling are often referred to as "glasses," hence the name bulk metallic glasses. There are additional ways besides rapid cooling to produce amorphous metals, including physical vapor deposition and melt spinning. Regardless, amorphous alloys are considered to be a class of materials and will be treated as such throughout this disclosure.

BMGs can be produced through a variety of cooling methods, including sputtering molten metal onto a spinning metal disk or by critical cooling low enough to allow formation of amorphous structure.

Amorphous alloys for use herein can be either pure metals or alloys. These alloys may contain atoms of significantly different sizes, leading to low free volume and high viscosity in a molten state. High viscosity prevents the atoms from moving enough to form an ordered lattice. Further, the amorphous alloy structures also results in low shrinkage during cooling and resistance to plastic deformation.

Thermal conductivity of amorphous materials may be lower than that of their crystalline counterparts. To achieve formation of an amorphous structure during slower cooling, the BMG may be made of three or more elements, leading to complex crystal units with higher potential energy and lower probability of formation. Formation of BMGs depends on several factors including: the identity and number of elements of the alloy; the atomic radius of the elements (typically over 12% difference to achieve high packing density and low free volume); and the negative heat of mixing the combination of elements.

A material can have an amorphous phase, a crystalline phase, or both. The amorphous and crystalline phases can have the same chemical composition and differ only in the microstructure, i.e., one amorphous and the other crystalline. Alternatively, the two phases can have different chemical compositions and microstructures. For example, a composition can be partially amorphous, substantially amorphous or completely amorphous. Embodiments herein are designed to minimize the crystalline microstructure and maximize the amorphous microstructure.

As noted above, the degree of amorphicity can be measured by fraction of crystals present in an alloy. The degree can refer to volume fraction or weight fraction of the crystalline phase present in an alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. A compositions that is at least substantially amorphous, can refer to one of which at least about 90 vol % is amorphous, such as at least about 95 vol %, such as at least about 98 vol %, such as at least about 99 vol %, such as at least about 99.5 vol %, such as at least about 99.8 vol %. In some embodiments, a substantially amorphous composition can have some incidental, insignificant amounts of crystalline microstructure present therein. In such cases the substantially amorphous composition may be considered 100% vol % amorphous.

The BMG embodiments herein may include fibers and tows applicable to any type of BMG. Similarly, the BMG described herein as a constituent of a fiber, tow or weave can be of any type. The BMG can comprise the element zirconium, (Zr), hafnium (Hf), titanium (Ti), copper (Cu), nickel (Ni), platinum (Pt), palladium (Pd), iron (Fe), magnesium (Mg), gold (Au), lanthanum (La), silver (Ag), aluminum (Al), molybdenum (Mo), niobium (Nb), beryllium (Be) or a combination thereof. Namely the BMG can include any combination of these elements in its chemical formula or chemical composition. The elements can be present at different weight or volume percentages. For example, an iron based BMG can refer to an alloy having a non-insignificant weight percentage of iron present therein. Alternatively, BMGs herein can be zirconium based, titanium based, platinum based, palladium based, silver based, copper based, iron based, nickel based, aluminum based, molybdenum based and the like. The BMGs herein can also be free of any of the aforementioned elements to suit a particular purpose. For example, embodiments can include an alloy that is substantially free of nickel, aluminum, titanium and the like.

BMGs of embodiments herein can have the formula $(Zr,Ti)_a(Ni, Cu, Fe)_b(Be, Al, Si, B)_c$, wherein "a", "b" and "c" each represent a weight or atomic percentage. In one embodiment, "a" is in the range of from 30 to 75, "b" is in the range of from 5 to 60, and "c" is in the range of from 0 to 50. Alternatively, a BMG can have the formula $(Zr,Ti)_a(Ni,Cu)_b(Be)_c$, where "a", "b", and "c" each represents a weight or atomic percentage. In one embodiment, "a" is in the range of from 40 to 75, "b" is in the range of from 5 to 50 and "c" is in the range of from 5 to 50. In another embodiment the BMG can also have the formula $(Zr,Ti)_a(Ni, Cu)_b(Be)_c$, where "a", "b", and "c" each represents a weight or atomic percentage. Here "a" can be in the range of from 45 to 65, "b" is in the range of from 7.5 to 35, and "c" is in the range of from 10 to 37.5. In still another embodiment, the BMG can have the formula $(Zr)_a(Nb,Ti)_b(Ni,Cu)_c(Al)_d$, where "a", "b", "c", and "d" each represents a weight or atomic percentage. Here "a" is in the range of from 45 to 65, "b" is in the range of from 0 to 10, "c" is in the range of from 20 to 40 and "d" is in the range of from 7.5 to 15. One illustrative embodiment is a Zr—Ti—Ni—Cu—Be based BMG under the tradename Viteloy™.

Other exemplary BMGs include ferrous metal-based alloys. For example, compositions for inclusion herein are disclosed in US Pat. Application Publication Nos. 2007/0079907 and 2008/0118387. Compositions include a Fe(Mn, Co, Ni, Cu)(C, Si, B, P, Al) system, wherein the Fe content is from 60 to 75 atomic percent, the total of (Mn, Co, Ni, Cu) is in the range from 5 to 25 atomic percent, and the total of (C, Si, B, P, Al) is in the range of from 8 to 20 atomic percent. One illustrative composition is $Fe_{48}Cr_{15}Mo_{14}Y_2C_{15}B_6$. These embodiments also include systems described by Fe—Cr—Mo—(Y,Ln)-C—B, Co—Cr—Mo-Ln-C—B, Fe—Mn—Cr—Mo—(Y,Ln)-C—B, (Fe, Cr, Co)—(Mo, Mn)—(C, B)—Y, Fe—(Co, Ni)—(Zr, Nb, Ta)—(Mo, W)—B, Fe—(Al, Ga)—(P, C, B, Si, Ge), Fe—(Co, Cr, Mo, Ga, Sb)—P—B—C, (Fe, Co)—B—Si—Nb, and Fe—(Cr—Mo)—(C, B)-TM, where Ln denotes a lanthanide element and TM denotes a transition metal element.

BMGs herein also include ferrous alloys, such as (Fe, Ni, Co), a few illustrative Fe based alloys include: $Fe_{72}Al_5Ga_2P_{11}C_6B_4$ and $Fe_{72}Al_7Zr_{10}Mo_5W_2B_{15}$. Illustrative alloys are described in U.S. Pat. Nos. 6,325,868, 5,288,344, 5,368,659, 5,618,359 and 5,735,975.

As can be envisioned, BMG embodiments herein can further include additional elements, such as additional transition metal elements, including niobium, chromium (Cr), vanadium (V) and cobalt (Co). The additional elements can be present at less than or equal to about 30 wt %, 20 wt %, 10 wt %, 5 wt %, 1 wt %. Optional elements may also include: manganese, zirconium, tantalum, tungsten, yttrium, titanium, and hafnium. Further optional elements may include phosphorous, germanium, and arsenic, totaling up to 2% and likely less than 1 wt % of the total.

Note that BMGs may also include a small amount of impurities. In some instances the impurities are added to modify the properties of a fiber, tow or weave. In other instances the impurities are present as inevitable, incidental impurities, such as those obtained as a byproduct of processing and manufacturing. Impurities can be less than or equal to 10 wt %, 5 wt %, 2 wt %, 1 wt %, 0.5 wt %, and 0.1 wt %.

BMG Fibers and Tows

BMG fibers, in accordance with embodiments herein, may be drawn, extruded, molded or otherwise fabricated using a variety of BMG-specific processes. BMG fibers and tows may be prepared in a manner similar to known procedures for carbon, aluminum, titanium and the like or as described in US Pat. Application Publication Nos. 2013/0306197 and 2013/0306199, each of which is incorporated by reference for all purposes.

Figure 3A:
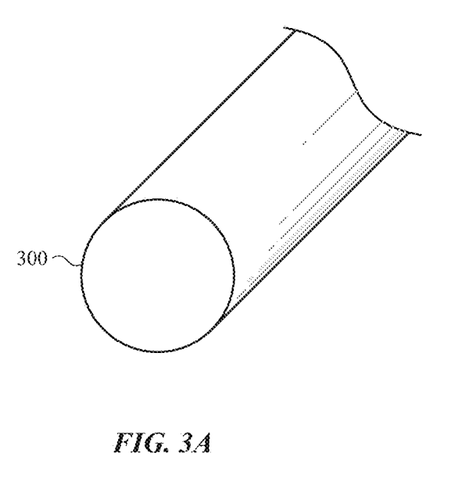
FIGS. 3A, 3B and 3C show a schematic of an exemplary BMG fiber (A), BMG tow (B) and BMG weave pattern (C).

FIG. 3A shows a schematic of an end view of an illustrative BMG fiber 300. As noted above, BMG fibers used herein may be chosen from any of the BMG alloys discussed above.

Fiber structures are typically of a suitable length having a cylindrical or tubular cross-sectional shape. However, other cross-sectional shapes are envisioned to be within the scope of the present disclosure, including oval, square, rectangular, diamond, triangular, and the like. Typical fiber diameters are in the 0.001 mm to 5 mm range, more typically in the 0.05 mm to 1 mm range and most typically around 0.05 to 0.1 mm range. Some embodiments herein have fiber diameters around 0.1 mm in diameter.

Suitable fiber lengths can include from 5 mm to 1 meter or more, and are more typically of a length required for a particular BMG feedstock. In some aspects fiber length herein is between 10 mm to 10 cm and more typically 25 mm to 5 cm and 25 mm and 1 cm.

Figure 3B:
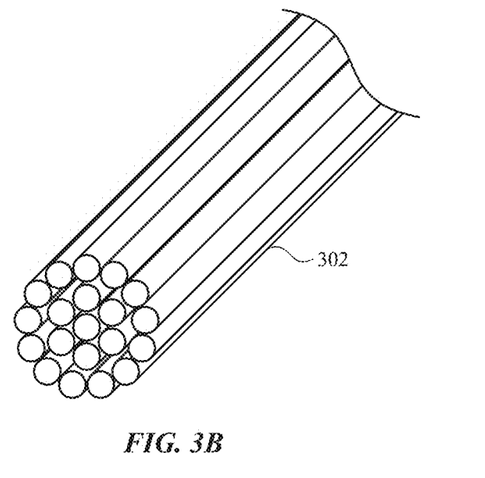

BMG fibers are typically bundled together to provide BMG tows of appropriate diameter and length for production of BMG weaves. One such illustrative BMG tow is shown in FIG. 3B. In some aspects, a BMG tow could be formed from one fiber where the fiber is of sufficient diameter to be of use in preparing a BMG weave. However, BMG tows herein are typically formed from 2 to 10,000 BMG fibers and more typically between 5 and 1,000 fibers. BMG tow diameters are in the 0.005 mm to 5 mm range, more typically in the 0.05 mm to 1 mm range and most typically around 0.1 to around 0.5 mm in diameter.

BMG Weaves:

BMG tow fabrication is designed to provide appropriate strength requirements for a desired BMG weave. As noted above, tows can be formed out of one fiber of appropriate diameter or thousands of bundled fibers. Tow diameter for use in a weave is typically determined by the strength required for the weave.

Again referring to FIG. 3B, a BMG tow 302 in accordance with embodiments herein is shown, the tow is formed from 21 BMG fibers providing a BMG tow of appropriate diameter, for example 0.5 mm. Also note that although BMG tows herein are typically formed from uniformly shaped fibers, it is envisioned that for particular uses a tow may be prepared from a plurality of fibers having different strengths and therefore diameters. Also note that any one BMG tow may be prepared from a variety of useful BMG alloys, for example, a BMG tow formed from 50% fibers composed of an iron-based BMG and 50% fibers from a zirconium-based BMG.

BMG tow fabrication may also be designed to provide additional requirements for a desired BMG weave. Tows can be formed out of BMG fibers and fibers of carbon, aluminum, titanium, and the like. For example, a BMG composite tow may include 50% BMG fibers, 25% dry carbon fibers and 25% aluminum fibers. Tows formed of multiple different fiber compositions are referred to herein as BMG composite tows.

In embodiments herein, BMG tows are woven together using weaving techniques typical for carbon fiber weaves.

Although not discussed in as great a detail, embodiments herein may also include other complex structures including braids, cylinders and the like. BMG braids in accordance with the present disclosure can be complex structures formed by interlacing two or more BMG tows to form elongated BMG structures. Typical braid structures utilize a zigzag forward approach, where one BMG tow, out of a group of two or more, for example, zigzags through the other BMG tow(s). As can be imagined BMG braid embodiments provide elongated and strengthened wires, which can also be used as a tow/wire in BMG weaves. As such, the remainder of this disclosure is focused on BMG weaves realizing there may be instances where a BMG structure may have an alternative use (braid, cylinder, etc.). These alternative uses are within the scope of the present disclosure.

BMG weaves in accordance with the present disclosure can also be complex structures including weaves that are unidirectional, bidirectional, triaxial, quadaxial, satin, planwoven or twill woven (1×1, 2×2, 3×1, . . . ). In general, a weave design for forming a BMG feedstock is identified for desired weave strength, weave flexibility, and the like.

Figure 3C:
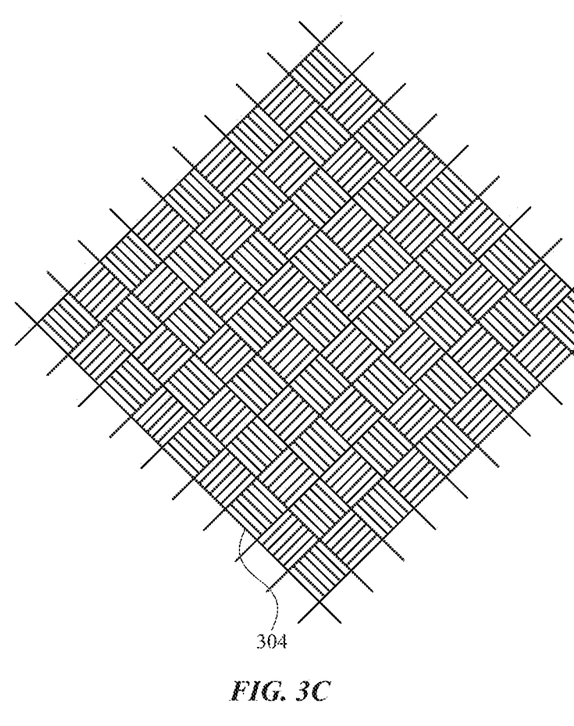

FIG. 3C provides a simple schematic of an illustrative bidirectional weave 304 for use herein.

Embodiments utilizing a unidirectional weave include BMG tows that run in the same direction. BMG unidirectional weaves are beneficial for parts that require strength in a single direction, for example, a wingspar of an airplane.

Embodiments utilizing a bidirectional weave include BMG tows that run in two directions, for example the two tows are perpendicular to each other. BMG bidirectional weaves are beneficial where strength is required in multiple directions. Bidirectional weaves may be used in the fabrication of electronic and non-electronic housings, cell phone cases, car hoods, and the like.

Embodiments utilizing a triaxial weave include BMG tows that are typically aligned in a 0, +45°, and −45° orientation. BMG triaxial weaves provide strength and stiffness to a part's torsional flex (prevents twisting of a part).

Embodiments utilizing a quadaxial weave include BMG tows that are typically aligned in a 0, +45°, −45° and 90° orientations. BMG quadaxial weaves provide strength and stiffness to a part's torsional flex in all directions.

In addition, BMG weaves can be prepared using different diameter tows for different reinforcement characteristics. For example, use of a thicker diameter BMG tow in only one of the directions of a bidirectional weave. As can be imagined, the direction, orientation, diameter, and uniformity of a weave can be adjusted to maximize a feedstock or part's strength, elasticity and stiffness.

As discussed briefly, each of the embodiments above may also be weaved using BMG composite tows, designed to produce a desired feedstock or part characteristic. In these embodiments, the BMG composite tow is formed from a combination of different fiber combinations. For example, a BMG composite tow may be formed by bundling BMG fibers with carbon fibers or BMG fibers with aluminum fibers. Fiber combinations may be adjusted and combined with other types of BMG composite tows or with other BMG tows to produce a desired weave composition.

In alternative embodiments, a BMG weave may be fabricated from tows composed of BMG and of 100% other materials, for example, a weave formed of BMG tows and carbon tows. In this embodiment, composite tows of carbon, Kapton® (polyimide), Teflon, Kevlar® (aramid fiber), titanium, aluminum, chapped ceramic (alumina-silicate), and the like, can be weaved together with BMG tows or BMG composite tows to produce target composite weaves. As can be envisioned, the combination of BMG tows, BMG composite tows, or 100% composite tows, can each be used to produce a weave of appropriate strength, ductility, stiffness, elasticity, etc. for use as a desired feedstock for parts (discussed more fully below).

Thermoplastic Formation

Figure 4:
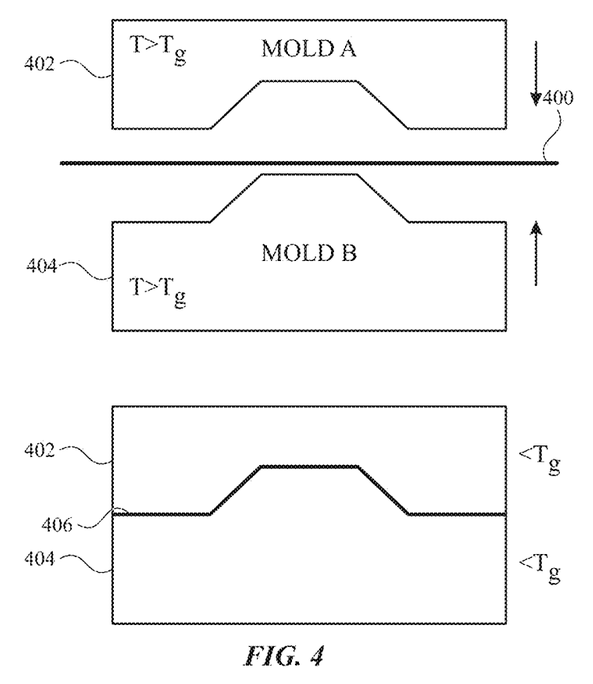
FIG. 4 shows a schematic of an exemplary BMG weave (top) undergoing thermoplastic molding (bottom).

FIG. 4 provides a schematic of a BMG weave being molded to a BMG sheet having a desired shape or part. As shown in the top panel, a BMG weave 400, in accordance with the present disclosure, is placed between a Mold A 402 and Mold B 404. Mold A and Mold B can be of any desired shape useful in hot molding BMG materials.

Mold A and Mold B are both at a temperature above the Tg of the BMG weave or composite weave to ensure thermoplastic heating of the weave. A temperature controlled mold of one or more pieces (in FIG. 4 of two pieces) adds heat and pressure to the BMG weave 400 so that the BMG weave takes the shape of the mold, i.e., forming BMG part 406. The BMG part 406, having been hot formed, exhibits a unitary BMG structure composed from the BMG tows and BMG composite tows. As discussed above, the BMG weave is susceptible to thermoplastic formation due to the individual BMG fibers and tows being of small diameter and length, and thereby having a lower plasticity boundary as compared to a unitary BMG of the same volume.

Mold A and Mold B may be composed of any molding material useful in thermoplastic heating, under pressure, for example, copper.

Figure 5:
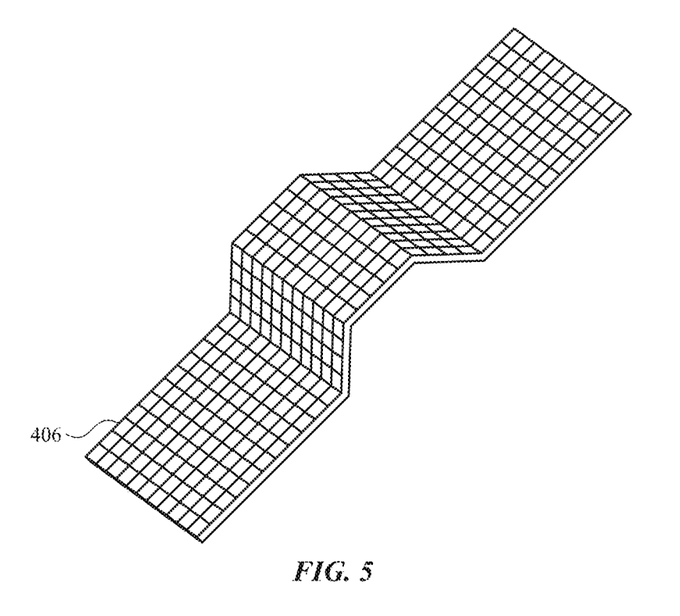
FIG. 5 shows a schematic BMG weave fabricated part.

FIG. 5 shows a near-net or net-shape part, as prepared in FIG. 4. Individual BMG tows, BMG composite tows and composite tows in a weave are bonded to each other plastically. Before the heated BMG weave crystallizes, the BMG part is quenched to below Tg of the BMG alloy, using a critical cooling rate for the BMG. Where multiple BMG alloys are utilized in making a BMG weave, the highest Tg and critical cooling rate are used for the part.

BMG parts can be fabricated using hot forming as shown in FIG. 4 and FIG. 5. In addition, BMG sheets may be fabricated in the same manner using flat sheets (molds), for example, flat sheets made of copper. The thermoplastic forming, quenching and composite inclusion in BMG weaves provide mechanisms for minimizing crystal formation and for minimizing the effect crystals have on a BMG part if formed.

Embodiments herein also include BMG sheets or BMG parts 406 formed from layering BMG weaves for hot forming, for example, a combination of two or more, three or more, four or more, and the like, weaves on top of each other and then heated under pressure. In this embodiment, in addition to the individual BMG tows within any one weave, the tows and fibers between any two separate weaves will also bond to each other. This multiple BMG weaves cam be bonded together to form thicker, more pliable, larger BMG sheets or parts.

Epoxy Formation

Embodiments herein also provide BMG weaves that are impregnated with epoxy for part's fabricated by a layer-by-layer build-up or -out. In these embodiments, the epoxy impregnated BMG weaves are added to an appropriately shaped mold in order to fabricate a desired BMG part. In these embodiments, the BMG impregnated weave is not thermoplatically molded, but rather the BMG weaves rely on epoxy adhesion to form useful parts. Molding techniques known for carbon fiber laminate production can be utilized to prepare the laminate structure.

Epoxy materials for impregnating a BMG weave herein can include but is not limited to: polyamides, polyimides, polyethersulphones, polyetheretherketones, polyurethanes, polyethylene, polyphenylene sulfides, acrylonitrile butadiene styrene, polyarylate, polysulphone, polyethersulphone, and polyphenylene ether. In some embodiments it is envisioned that the weave be reinforced with thermosetting polymers, e.g., epoxies, unsaturated polyester resins, melamine, pheno/formaldehyde resins, polyurethanes and etcetera.

Once a BMG weave is impregnated with epoxy and appropriately placed in a desired shape, curing would be performed on the impregnated weave using vacuum bagging, autoclaving, out-of-autoclaving curing, heat pressing, or resin transfer molding.

In these epoxy based embodiments, the BMG weaves and composite weaves conform to the mold shape using the above curing techniques. However, because the temperatures are below the Tg of BMGs, the BMG fibers and tows do not adhere to themselves through thermoplastic forming but rather maintain integrity via the epoxy materials (chemical bonding).

Finally, it is also envisioned that hybrid part formation may also be performed using a combination of both thermoplastic forming and epoxy curing. In these embodiments, near-net shaped molded BMG sheets or composite sheets would be fabricated as discussed in FIG. 4 (thermoplastically), then the BMG feedstock or sheet subsequently bonded to additional epoxy impregnated BMG weaves. These embodiments would enable higher temperature (above Tg) thermoplastic forming of BMG feedstock into near-net shape parts and then additions to the thermoplastically formed part using epoxy impregnated BMG weaves. The impregnated epoxy BMG weaves would only require lower temperature epoxy curing which would not affect the final shape of the thermoplastically formed aspects of the BMG part.

Embodiments herein also include taking BMG or BMG composite tows or braids and using them in a filament winding process in which the tows and braids are wrapped around a mandrel or core to make a desired shape. The wrapped tows and braids can then be heated above Tg under pressure to form thermoplastically formed vessels, cylinders, and other like parts. As can be envisioned, similar techniques for use of the impregnated BMG tows and weaves could also be utilized or the combination of first thermoplastically forming the shape on the mandrel or core followed by adding epoxy cured BMG tows and braids to the part.

As previously pointed out, embodiments herein provide BMG sheets and/or parts of large areas and various sized thickness. These embodiments, therefore, provide a significant improvement over conventional BMG feedstock and part production, particularly over techniques that require high pressure and high speed casting. Embodiments herein also provide significant improvement in reducing of crystallinity in feedstock and parts.

Electronic Devices

Embodiments herein can be valuable in the fabrication of electronic devices and/or articles integrated in electronic devices. Embodiments herein provide the BMG and BMG composite feedstock as well as near-to-net shaped parts integral to electronic devices. An electronic device herein can refer to any electronic device known in the art, for example, mobile telephone, smart phone, computer, electronic e-mail sending or receiving device, health-monitoring device, wearable electronic device, DVD player, Blue-Ray disc player, video game console, and the like. Electronic devices or articles integrated into an electronic device can also refer to a display, TV monitor, book-reader, web-browser, computer monitor, and the like or to accessories such as casings, laptop housings, smart phone housings, laptop track pads, keyboard, mouse, speakers, etc.

In one embodiment, a portable electronic device can include a cover sheet and an enclosure or housing made of the BMG feedstock or composite feedstock described herein. The cover sheet can be composed of a polished glass, sapphire or other hardened transparent material. The housing and cover sheet come together to form an interior volume configured to enclose the various electronic components of the device. For example, the housing may define an opening in which a display is positioned. The cover sheet is positioned over the display and forms a portion of the exterior of the device. The display may include a liquid crystal device (LCD), or organic light-emitting diode (OLED) display, or other suitable display elements or components.

In accordance with embodiments herein, the housing may be formed from BMG feedstock embodiments described herein. The housing embodiments may be of a thickness above 0.1 mm, and more typically above 0.5 mm. The BMG feedstock may be BMG or BMG composites.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

EXAMPLES

The following examples are provided for illustrative purposes only and are not intended to limit the scope of the disclosure.

Example 1: BMG Fiber Production

Figure 6A:
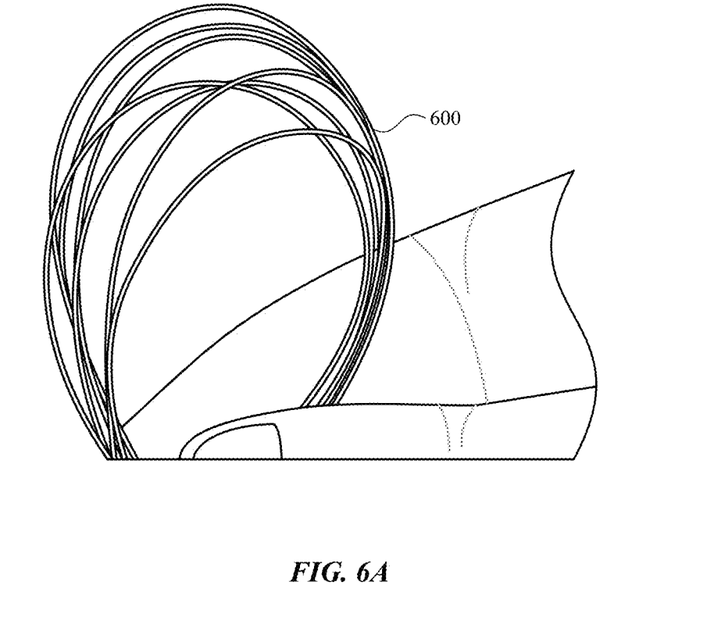
FIG. 6A shows a bundle of BMG fibers for use in preparing a BMG weave.
Figure 6B:
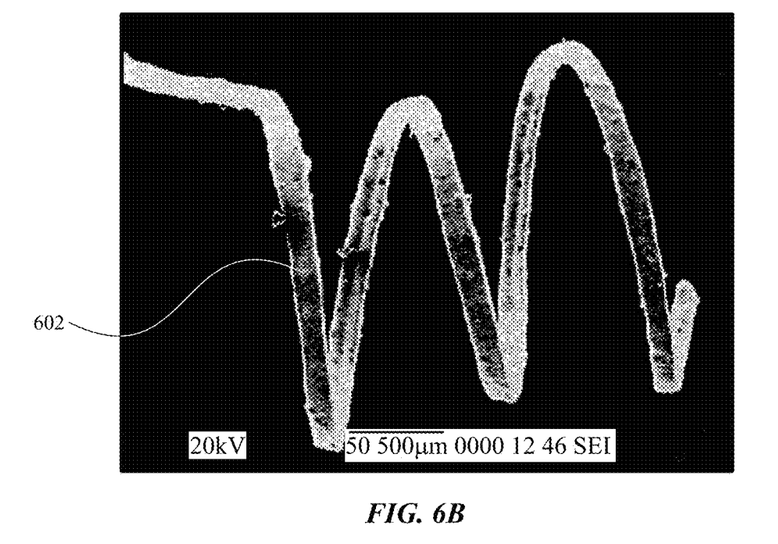
FIG. 6B shows a BMG fiber having a 0.1 mm diameter.
Figure 6C:
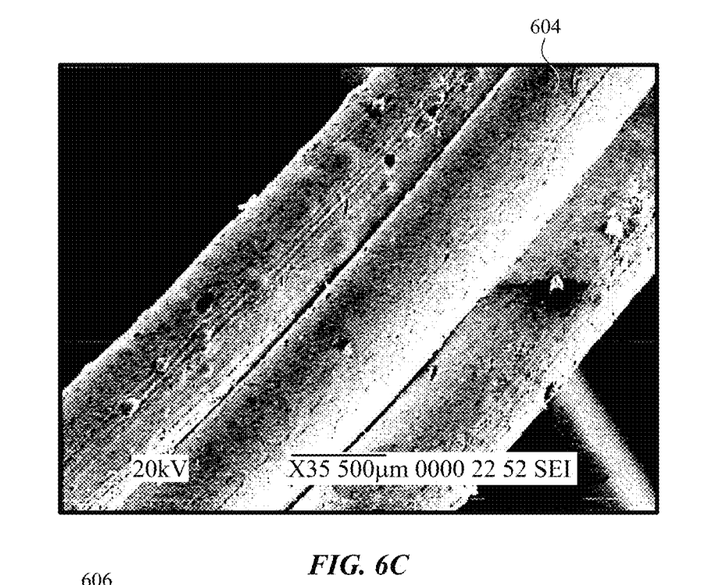
FIG. 6C shows a three BMG fiber tow.

BMG fibers in accordance with embodiments herein are provided having diameters of approximately 0.1 to 0.5 mm. FIG. 6A shows a number of elastic BMG formed fibers 600 for use in preparing BMG weaves as disclosed herein. FIG. 6B shows a BMG fiber 602 having a 0.1 mm diameter. FIG. 6C shows three BMG fibers 604 having 0.1 mm diameters.

Figure 6D:
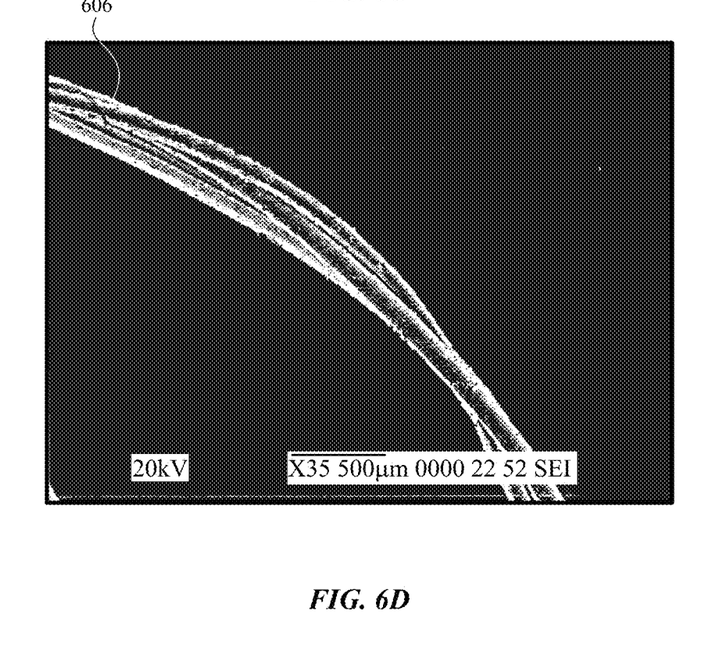
FIG. 6D shows a three BMG fiber braid.

FIG. 6D provides a three fiber braid 606 where the BMG braid has an approximate diameter of 0.5 mm.

Example 1 and FIG. 6A-D provide illustrative fibers that may be manufactured and used to prepare tows of varying diameters. As can be seen, the use of small diameter fibers are highly useful in building up tows, braids, weaves and ultimately sheets and feedstock for parts as described herein. These materials provide significant control and improvement over conventional techniques, particularly where greater plasticity for thermoplastic formation is necessary.

Example 2: BMG Weaves and Feedstock

Figure 7A:
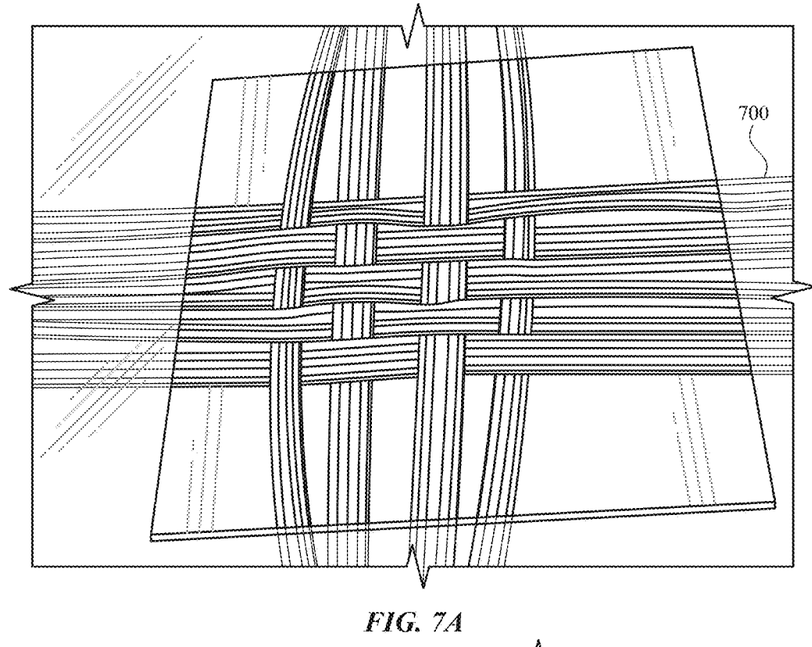
FIGS. 7A and 7B show a BMG fiber weave pattern.
Figure 7B:
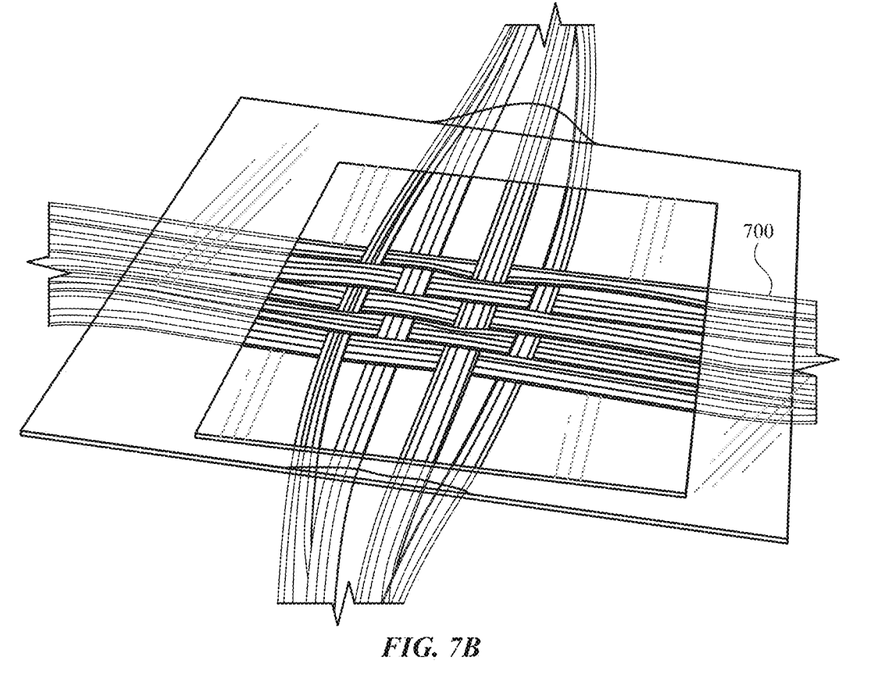
Figure 7C:
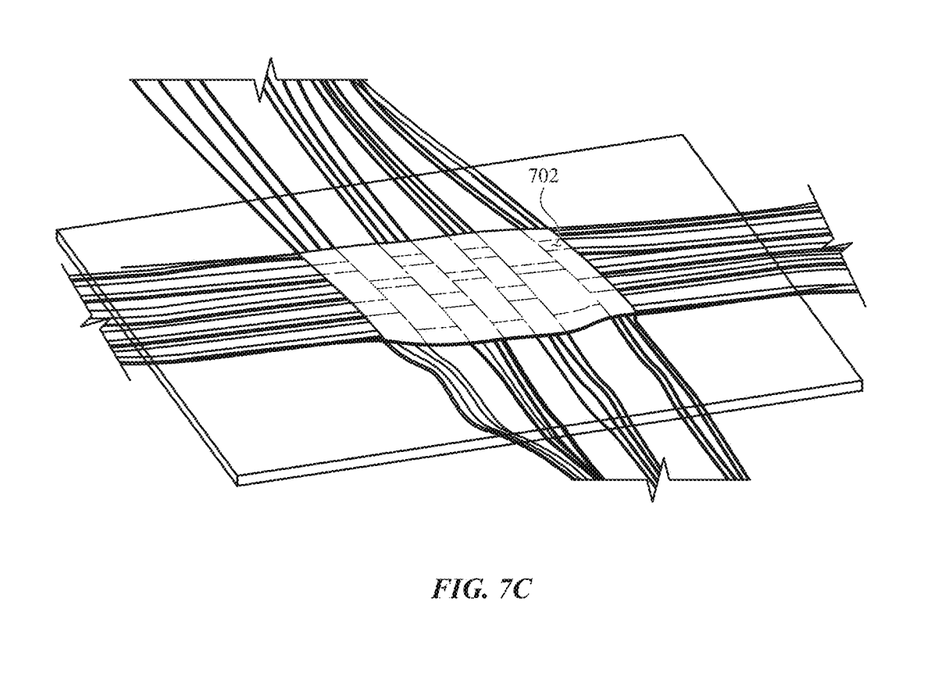
FIGS. 7C and 7D show the same two weaves in FIGS. 7A and 7B, respectively, after hot forming.
Figure 7D:
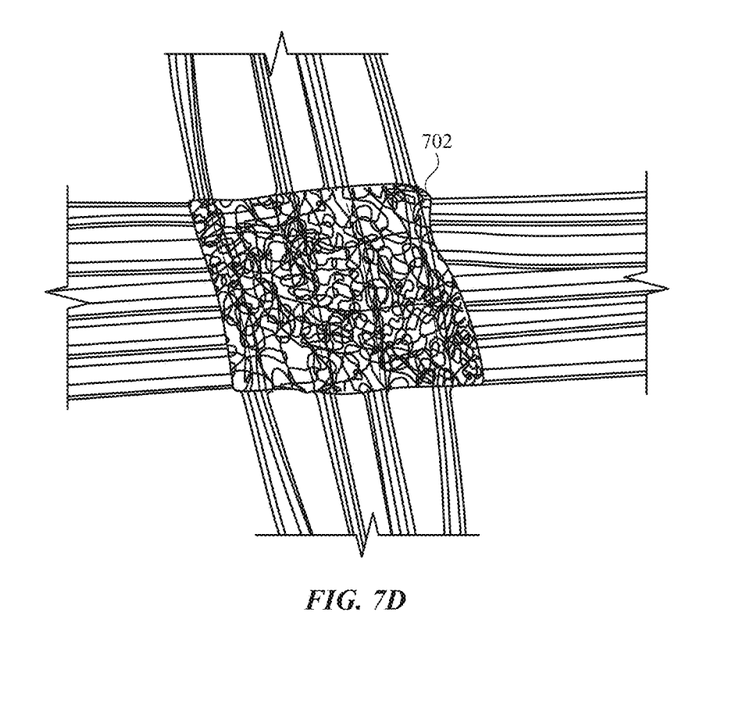

BMG weaves in accordance with embodiments herein are provided prior to thermoplastic heating (FIGS. 7A and B) and after hot forming (FIGS. 7C and 7D). FIG. 7A-D shows tows formed from 7 fibers each. BMG weaves in 7A and B were pressed into BMG sheets having 0.13 mm thickness. The hot forming was performed by pressing the weaves in 7A-B with two copper sheets at 450° C. for a total of 60 seconds. The thermoplastically formed sheets were water quenched with a soak pressure of 15 lbf. The forming pressure was 1,000 lbf.

Example 2 and FIG. 7A-D provide illustrative BMG weaves and hot formed sheets. The sheets have a thickness of 0.13 mm. BMG sheets of large areas can be prepared using the embodiments as described herein. FIG. 7A-D shows that the area is dependent on the hot forming apparatus. Also, because the hot forming is uniform, the resultant sheet production will also be uniform, a significant improvement over conventional technologies.

What is claimed is:

1. An electronic device housing comprising:
    a molded structure defining an opening configured to accommodate a display, the molded structure including a woven structure comprising:
        a first tow comprising a first bulk metallic glass fiber; and
        a second tow interwoven with the first tow and comprising a second bulk metallic glass fiber, the second bulk metallic glass fiber bonded to the first bulk metallic glass fiber via a metal to metal bond between the first bulk metallic glass fiber and the second bulk metallic glass fiber, thereby forming a unitary bulk metallic glass structure.

2. The electronic device housing of claim 1, wherein the woven structure further comprises a composite tow interwoven with the first tow and the second tow.

3. The electronic device housing of claim 2, wherein the composite tow comprises a carbon fiber.

4. The electronic device housing of claim 1, wherein the first tow is a composite tow and further comprises a fiber selected from the group consisting of a carbon fiber, an aluminum fiber, a titanium fiber, a ceramic fiber, and combinations thereof.

5. The electronic device housing of claim 1, wherein each of the first tow and the second tow is a bulk metallic glass tow.

6. The electronic device housing of claim 1, wherein:
    the molded structure is a molded bulk metallic glass sheet; and
    the second bulk metallic glass fiber and the first bulk metallic glass fiber are bonded and deformed to a shape of the electronic device housing as a result of a thermoplastic forming process.

7. The electronic device housing of claim 2, wherein:
    the molded structure is a molded bulk metallic glass composite sheet; and
    the second bulk metallic glass fiber and the first bulk metallic glass fiber are bonded and deformed to a shape of the electronic device housing as a result of a thermoplastic forming process.

8. The electronic device housing of claim 6, having a thickness of greater than 0.1 mm.

9. The electronic device housing of claim 6, wherein the first tow and the second tow are interwoven together to form a unidirectional weave.

10. The electronic device housing of claim 6, wherein the first tow and the second tow are interwoven together to form a bidirectional weave.

11. The electronic device housing of claim 1, wherein: the molded structure has a thickness of at least 0.1 mm.

12. The electronic device housing of claim 5, wherein the electronic device housing is a mobile phone housing.

13. A method comprising:
    forming a woven structure including weaving together a first tow comprising a first bulk metallic glass fiber and a second tow comprising a second bulk metallic glass fiber, thereby forming a metal to metal contact between the second bulk metallic glass fiber and the first bulk metallic glass fiber; and
    forming an electronic device housing comprising a molded structure defining an opening configured to accommodate a display, the operation of forming the electronic device housing comprising thermoplastically molding the woven structure to form the molded structure, thereby bonding the second bulk metallic glass fiber to the first bulk metallic glass fiber via a metal to metal bond and forming a unitary bulk metallic glass structure.

14. The method of claim 13, wherein forming the woven structure further comprises:
    weaving a composite tow with the first tow and the second tow.

15. The method of claim 13, wherein:
    the operation of thermoplastically molding the woven structure is at a temperature above a glass transition temperature (Tg) of the first and the second bulk metallic glass fibers; and
    the molded structure is quenched at a critical cooling rate for the first and the second bulk metallic glass fibers.

16. The method of claim 13, wherein the molded structure is in the form of a sheet.

17. The method of claim 13, wherein the woven structure is a first woven structure and further comprising:
    forming a second woven structure including weaving together a third tow comprising a third bulk metallic glass fiber and a fourth tow comprising a fourth bulk metallic glass fiber;
    impregnating the second woven structure with epoxy; and
    curing the impregnated second woven structure on the molded structure to form the electronic device housing.

18. The method of claim 17, wherein the epoxy is a thermosetting polymer.

* * * * *